United States Patent [19]
Folgner

[11] 3,746,224
[45] July 17, 1973

[54] INTERNAL SKI RACK FOR AUTOMOBILE

[76] Inventor: Claus-Peter Folgner, P.O. Box 292, Pineville, Pa. 18946

[22] Filed: Mar. 18, 1971

[21] Appl. No.: 125,554

[52] U.S. Cl............................................. 224/42.1 C
[51] Int. Cl............................................. B60r 11/00
[58] Field of Search................ 214/450; 224/42.1 C, 224/42.1 D, 42.1 F, 42.1 R, 42.1 B, 42.1 G, 45 S; 280/11.37 K, 11.37 A

[56] References Cited
UNITED STATES PATENTS

| | | | |
|---|---|---|---|
| 3,524,572 | 8/1970 | Hall................. | 224/42.1 F |
| 2,106,503 | 1/1938 | Hendrick........... | 280/11.37 K |
| 2,235,012 | 3/1941 | Colvin.............. | 224/42.1 F |
| 2,689,673 | 9/1954 | Richmond.......... | 224/42.1 C |
| 3,155,299 | 11/1964 | Horne et al........ | 224/42.1 C |
| 3,225,987 | 12/1965 | Bonner, Jr......... | 224/42.1 B |

*Primary Examiner*—Robert G. Sheridan
*Assistant Examiner*—Jerold M. Forsberg
*Attorney*—Sperry & Zoda

[57] ABSTRACT

Racks for supporting skis within a vehicle adjacent the roof thereof are provided with two longitudinally spaced transversely extending rigid strips of material with the strip located closer to the front of the vehicle being provided with openings through which the tail portions of skis may be passed and with the strip located closer to the rear of the vehicle being provided with flexible and preferably elastic elements, such as conventional ski clips, for holding the portions of the skis near the tips thereof in place.

1 Claim, 4 Drawing Figures

Patented July 17, 1973 3,746,224

INVENTOR,
CLAUS-PETER FOLGNER
BY Sperry and Zoda
ATTORNEYS

INTERNAL SKI RACK FOR AUTOMOBILE

FIELD OF THE INVENTION

It is common practice for a party of skiers to travel together to a ski resort and at such time, it is often desirable to use a station wagon or similar vehicle to transport the passengers together with their skis and luggage. The skis are often carried in racks on the roof of the vehicle, but it is seldom possible to carry both the luggage and the skis on the top or exterior of the car. Moveover, skis are expensive and subject to damage upon vibration and jolting of the car as it travels over rough and icy roads. Furthermore, if the skis are carried on the exterior of the car, they may be stolen or damaged by falling objects such as stones, tree limbs or may become covered with dirt, salt, or other corrosive material.

Various devices have been suggested heretofore for use in supporting skis and the like within a vehicle as exemplified by U. S. Pat. Nos. 2,552,293; 2,689,673; and 3,155,299. However, such constructions either do not afford suitable support and protection for the skis or are not so designed as to be capable of use with skis having ski bindings fixed thereto between the toe and the tail of the ski.

In accordance with the present invention, a novel type of ski rack is provided which is adapted to be attached to the interior of the roof of a station wagon or the like to receive and hold the skis in predetermined positions and in a manner to protect them against vibration or movement which might injure the skis or permit them to be displaced upon starting, stopping or bouncing of the car. For this purpose, two transversely extending members are positioned in longitudinally spaced relation near the front and rear portions of the roof of the vehicle. That member located nearer the front of the vehicle is designed to receive and support the portions of the skis between the ski binding and the tail of the skis, whereas that member located nearer the rear of the vehicle is designed to receive and support the portions of the skis between the ski bindings and the toe or shovel of the ski.

THE DRAWINGS

PREFERRED EMBODIMENTS

Figure 1:
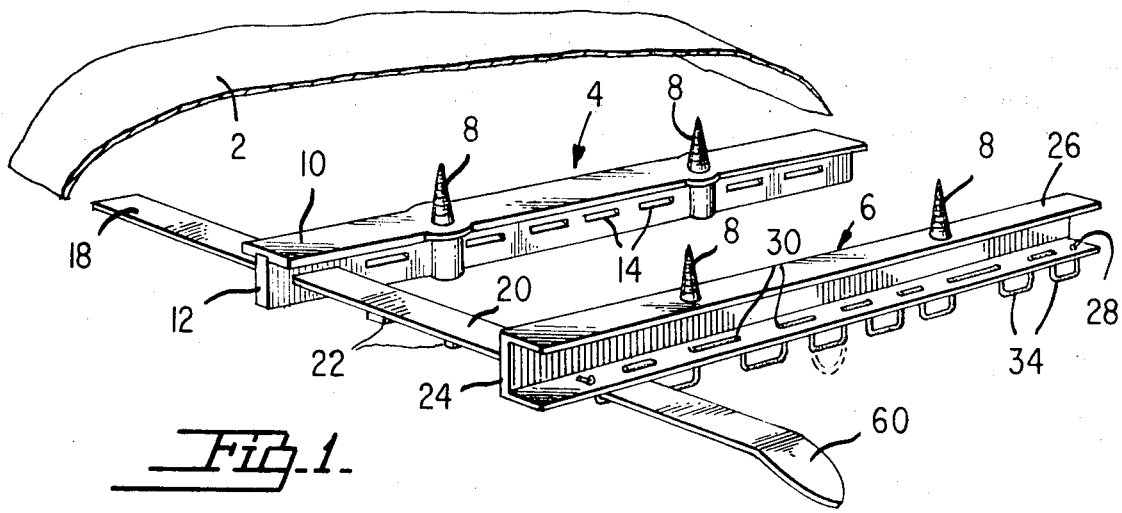
FIG. 1 is a diagrammatic perspective view of a typical assembly embodying the present invention with a portion of the roof of the vehicle removed to show details of construction.

In that form of the invention chosen for purposes of illustration in FIG. 1 of the drawing, a vehicle such as a station wagon, having a roof 2, has a front supporting means 4 and a rear supporting means 6, each of which is adapted to be secured to the roof of the vehicle by fastening means such as the screws 8. Each of the supporting means embodies a stiff, elongated member extending transversely of the vehicle and the members are spaced apart longitudinally of the vehicle a sufficient distance to allow the ski bindings of the various skis to be located between the two members. The front supporting member 4 is thus designed to receive and support that portion of each ski between the ski binding and the tail of the ski, whereas, the rear supporting member 6 receives and supports that portion of each ski between the ski binding and the toe or shovel of the ski.

Figure 2:
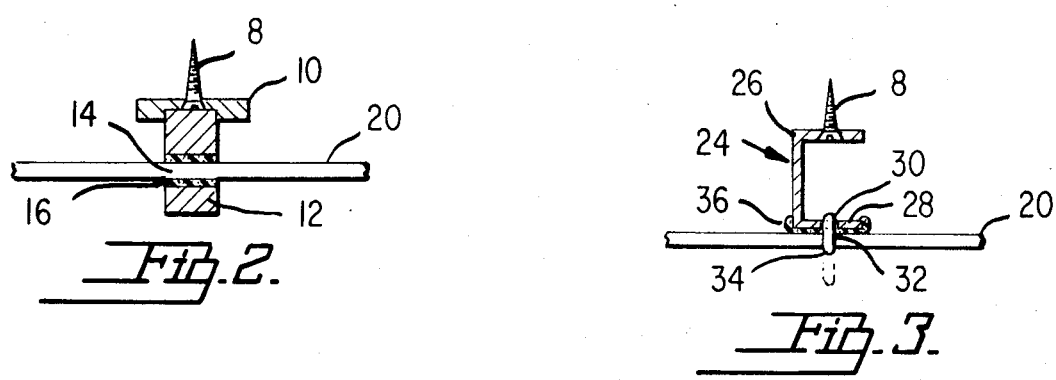
FIG. 2 is a vertical sectional view through one form of ski support for use near the front portion of a vehicle.

The front supporting member as shown in FIGS. 1 and 2 embodies a stiff backing member 10 formed of metal or the like which holds a ski-carrying portion 12, which may be formed of molded plastic or other material provided with openings 14 therethrough which are preferable substantially rectangular in shape and as shown in FIG. 2, are provided about the sides of the openings with yieldable material 16 such as felt or sponge rubber for affording a cushioned and protective support for the skis. The tail ends 18 of the skis 20 at the rear of the ski binding 22 may then be passed through the openings 14 into positions wherein the ski will be held against vibration, injury or displacement with respect to the supporting means 4.

Figure 3:
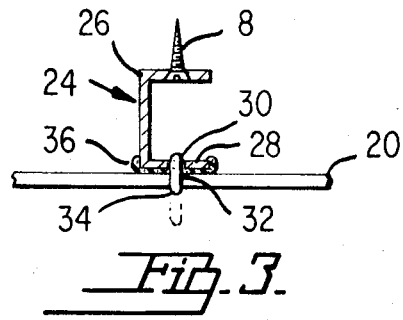
FIG. 3 is a view similar to FIG. 2 illustrating an alternative construction.

In the alternative, as shown in FIG. 3, the front supporting means may, if desired, embody an elongated molded or metal channel element 24 with an upper flange 26 through which the fastening members 8 may be passed, whereas the lower flange 28 of the channel member may have openings 30 therein through which an elastic member 32 may be threaded. Those portions 34 of the elastic member below the lower flange 28 can then be pulled downward, as indicated in dotted lines, to form an opening through which the tail of the ski may be passed after which the member may be released so that it will spring back to hold the ski in place adjacent the lower surface of the flange 28. When the channel element 24 is formed of metal, the lower flange 28 may be provided with a layer 36 of felt or protective material against which the ski will bear. However, if the channel member is formed of rubber or other relatively soft but stiff material, such a cushioning layer of material may not be necessary.

The rear supporting means 6, as shown in FIG. 1, is so designed as to present openings through which the toe or shovel of the ski may be moved by drawing the ski rearwardly after the tail of the ski has been passed through an opening 14 in the front ski supporting means 4. Thus, the construction of the rear supporting means 6 may be the same or similar to that shown in FIG. 3, for example.

Figure 4:
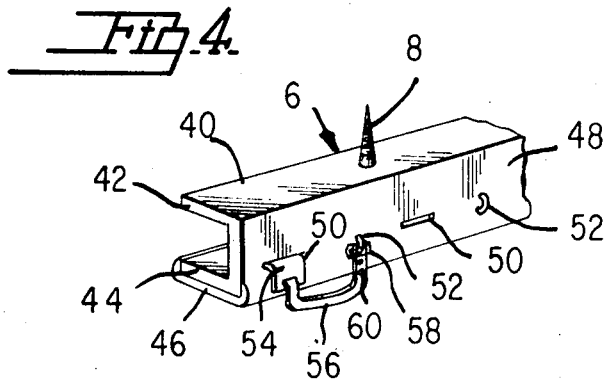
FIG. 4 is a perspective of a portion of a typical ski support for use near the rear portion of a vehicle.

In the alternative, as shown in FIG. 4, the rear supporting means 6 may be in the form of a channel element 40 formed of plastic, metal, or other relatively stiff material. The upper flange 42 of the channel member may be secured to the roof of the vehicle by fastening means 8, whereas the lower flange 44 of the channel member may be provided with a layer of sponge rubber, felt or other cushioning material 46. The face 48 of the channel member is provided with slots 50 and hooks or pins 52 arranged alternately throughout the length of the channel member. The slots 50 are formed to receive the hooks 54 of elastic ski clips 56, whereas the pins 52 receive the retaining loops 58 of the ski clips. The ski clips then serve to hold the tips or shovel portion 60 of the skis in place and in yielding contact with the lower surface of the rear supporting means 6. If the ski clips are too long to hold the skis firmly in place, holes may be punched in the ski clips as shown at 62 for engagement with the pins 52.

In each of the forms of the invention shown, the skis can be easily applied to the racks or supporting means by passing the tail portions of the skis at the rear of the ski bindings through the openings, loops, or other retaining members of the front supporting means. The toe or portions the skis in front of the ski binding may then be inserted through the elastic loops secured to the rear supporting means by ski clips or the like so that it is never necessary to move the ski bindings through the supporting means in order to secure the skis in place.

The construction thus provided serves to permit several sets of skis to be supported within the vehicle and adjacent the roof thereof, whereby the skis will be shielded from dirt, dust, or the corrosive action of salt and other melting agents frequently applied to roads. At the same time, the skis are held against vibration and longitudinal shifting as the vehicle starts, stops and travels over rough roads, by the cushioned mounting of the skis.

The supporting means provided are simple and economical to produce and install and are easy to use. Whereas, various typical embodiments of the invention have been shown in the drawings and described above, it should be understood that such constructions are intended to be illustrative only and are not intended to limit the following claims.

I claim:
1. Ski supporting means adapted to be mounted within a station wagon or other vehicle to support skis having ski bindings thereon within the vehicle, said supporting means comprising two elongated members adapted to be secured to the under side of the roof of the vehicle in positions extending transversely of the vehicle and spaced apart longitudinally of the vehicle a distance exceeding the length of the ski bindings on the skis, one of said members being located closer to the front of the vehicle and including a vertically projecting web provided with a plurality of transversely spaced substantially rectangular horizontal ski receiving openings, each of which presents inwardly facing yieldable surfaces formed to embrace and contact the tail portion of the skis throughout the circumference thereof, that member located closer to the rear of the vehicle being provided with a substantially flat, downwardly facing cushioned surface engageable by the toe portions of the skis and having a plurality of transversely spaced openings therein spaced apart a distance substantially equal to the width of a ski, and flexible elastic strap means connected to the rear member and extending into said openings, said strap means being arranged to embrace and urge the toe portions of the skis against said cushioned surface and into predetermined positions aligned with the rectangular openings in the front member.

* * * * *